United States Patent [19]
Lottanti et al.

[11] 3,954,712
[45] May 4, 1976

[54] HOT-CURABLE MIXTURES BASED ON EPOXIDE RESIN

[75] Inventors: Guiseppe Lottanti, Mutschellen; Ewald Forster, Allschwil; Friedrich Lohse, Oberwil; Rolf Schmid, Gelterkinden, all of Switzerland

[73] Assignee: Ciba-Geigy Corporation, Ardsley, N.Y.

[22] Filed: July 26, 1974

[21] Appl. No.: 491,961

Related U.S. Application Data

[63] Continuation-in-part of Ser. No. 397,523, Sept. 17, 1973, abandoned, which is a continuation of Ser. No. 305,778, Nov. 13, 1972, abandoned, which is a continuation-in-part of Ser. No. 289,896, Sept. 18, 1972, abandoned.

[30] Foreign Application Priority Data
Nov. 10, 1971 Switzerland.................. 16323/71

[52] U.S. Cl.................. 260/47 EA; 106/163 R; 260/9; 260/37 EP; 260/59 EP; 260/77.5 NC; 526/209; 526/217; 526/273; 526/320; 526/321; 526/325; 260/836; 260/837 R
[51] Int. Cl.²........................................ C08G 30/12
[58] Field of Search............... 260/78.4 EP, 59, 47, 260/77.5 NC, 835, 2 EA

[56] References Cited
UNITED STATES PATENTS

| | | | |
|---|---|---|---|
| 2,928,809 | 3/1960 | Hicks | 260/2 X |
| 3,427,255 | 2/1969 | Case | 252/426 |
| 3,438,909 | 4/1969 | Kleeberg et al. | 260/2 |

*Primary Examiner*—Murray Tillman
*Assistant Examiner*—T. Pertilla
*Attorney, Agent, or Firm*—Vincent J. Cavalieri

[57] ABSTRACT

The subject of the present invention is a hot-curable resin mixture which contains a polyepoxide compound, a dicarboxylic acid and a polycarboxylic acid anhydride and which can be used as an impregnating and laminating resin and as an adhesive but above all as a casting resin.

6 Claims, No Drawings

HOT-CURABLE MIXTURES BASED ON EPOXIDE RESIN

This application is a continuation-in-part application of our pending application Ser. No. 397,523, filed Sept. 17, 1973, (now abandoned) which application is in turn a continuation of application Ser. No. 305,778, filed Nov. 13, 1972 (now abandoned), which application is in turn a continuation-in-part application of our application Ser. No. 289,896, filed Sept. 18, 1972 (now abandoned).

Casting resin articles made from epoxide resins are exposed to very diverse conditions. On the one hand, they must be heat-stable but on the other hand it is necessary that the casting resin used for the purpose should have a high E-modulus coupled with high impact strength.

When using casting resin mixtures based on resins which are liquid at room temperature, for example on a resin of epichlorohydrin and bisphenol A having an epoxide equivalent of 5.3 per kg, curing with anhydrides yields moulded materials which whilst having high heat resistance are, however, too brittle for most applications.

In order to improve the impact strength, plasticisers are added to the resins, for example polyglycols, which partially or completely react chemically with the other components of the casting resin mixture. Such plasticising additives suffer from the disadvantage that they worsen the dielectric losses and the heat distortion point. Furthermore, the improvement of mechanical strength is only achieved to a limited extent.

The resin mixture according to the invention now makes it possible to manufacture mouldings which combine good mechanical and electrical properties, especially high impact strength, with a high heat distortion point.

The heat-curable resin mixture according to the invention is characterised in that it consists essentially of
a. a 1,2-polyepoxide;
b. a dicarboxylic acid of the formula I

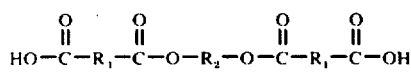

in which $R_1$ has the formula

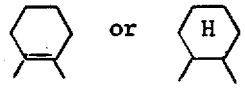

and $R_2$ is alkylene of the formula $-(CH_2)_{\overline{2 \text{ to } 12}}$ or

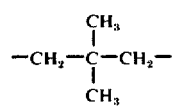

c. a polycarboxylic acid anhydride selected from the group consisting of methyltetrahydrophthalic anhydride and methylnadic anhydride; and
d. a quaternary ammonium compound or an imidazole catalyst,
and that 0.05 to 0.8 equivalent of said dicarboxylic acid (b) and 0.20 to 0.95 mol of said polycarboxylic acid anhydride (c) are present per 1 equivalent of said polyepoxide (a).

Preferably, 0.15 to 0.5 equivalent of the compound of the formula I and 0.5 to 0.85 mol of the polycarboxylic acid anhydride are present per one equivalent of the epoxide compound.

Suitable catalysts (d) are tetramethylammonium chloride, tetraethylammonium chloride, benzyltrimethylammonium chloride, dodecylbenzyldiethylammonium chloride and 2,4-methylethyl-imidazole.

As the polyepoxide compound in the mixture according to the invention it is possible to use one of the known compounds, especially di- or poly-($\beta$-methylglycidyl)-ethers and di- or poly-glycidyl-ethers of polyhydric phenols, such as resorcinol, bis(p-hydroxyphenyl)-methane, 2,2-bis-(p-hydroxyphenyl)propane (= bisphenol A or diomethane), 2,2-bis(4'-hydroxy-3',5'-dibromophenyl)-propane, 1,1,2,2-tetrakis(p-hydroxyphenyl)-ethane or condensation products of phenols, for example phenol with formaldehyde obtained under acid conditions; polyglycidyl esters and poly-($\beta$-methylglycidyl)-esters of polybasic aromatic carboxylic acids, such as phthalic acid, isophthalic acid, terephthalic acid, tetrachlorophthalic acid or trimellitic acid; N-glycidyl derivatives of aromatic amines, such as N,N-diglycidylaniline, N,N-diglycidyl-toluidine and N,N,N',N'-tetraglycidyl-bis(p-aminophenyl)methane.

Further possibilities are also following polyepoxide compounds: polyglycidyl esters of hydroaromatic polycarboxylic acids, for example $\Delta^4$-tetrahydrophthalic acid diglycidyl ester, 4-methyl-$\Delta^4$-tetrahydrophthalic acid diglycidyl ester, hexahydrophthalic acid diglycidyl ester, 4-methyl-hexahydrophthalic acid diglycidyl ester and also diglycidyl- or polyglycidyl-ethers and di- or poly-($\beta$-methylglycidyl)-ethers of alicyclic alcohols, such as, for example, the diglycidyl ethers or di-($\beta$-methylglycidyl)-ethers of 2,2-bis-(4'-hydroxycyclohexyl)-propane, 1,4-dihydroxycyclohexane (quinitol) or $\Delta^3$-cyclohexene-1,1-dimethanol; finally, triglycidylisocyanurate may also be mentioned.

To manufacture the compounds of the formula I, tetrahydrophthalic or hexahydrophthalic anhydride are preferably condensed with the suitable diols in the molar ratio 2:1, with warming.

Examples of possible diols are ethylene glycol, propane-1,2-diol, propane-1,3-diol, butane-1,4-diol, pentane-1,5-diol, neopentylglycol, hexane-1,6-diol and dodecane-1,12-diol.

The curable mixtures according to the invention can furthermore be mixed, in any state before curing, with customary modifiers such as extenders, fillers and reinforcing agents, pigments, dyestuffs, organic solvents, plasticisers, flow control agents, agents for conferring thixotropy, flameproofing substances and mould release agents.

As examples of extenders, reinforcing agents, fillers and pigments which can be employed in the curable mixtures according to the invention, there may be mentioned: textile fibres, glass fibres, boron fibres, carbon fibres, cellulose, polyethylene powder, polypropylene powder, mica, asbestos, quartz powder, slate powder, aluminium oxide trihydrate, chalk powder, gypsum, antimony trioxide, bentones, silica aerogel ("AEROSIL"), lithopones, baryte, titanium dioxide, carbon black, graphite, iron oxide or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

Furthermore, other customary additives, for example, flameproofing agents, agents for conferring thixotropy, flow control agents, such as silicones, cellulose acetobutyrate, polyvinyl butyral, waxes, stearates and the like (which in part are also used as mould release agents) can also be added to the curable mixtures.

The curable mixtures can be manufactured in the usual manner with the aid of known mixing apparatuses (stirrers, kneaders, mills and the like).

The curable epoxide resin mixtures are above all employed in the field of casting resin technology, but also in the fields of the electrical industry and laminating processes. They can be employed in a formulation suited in each case to the special end use, in the unfilled or filled state, optionally in the form of solutions, as stoving lacquers, sintering powders, compression moulding compositions, dipping resins, casting resins, injection moulding formulations, impregnating resins and adhesives, and as tool resins, laminating resins and potting and insulating compositions for the electrical industry.

The following diester-dicarboxylic acids are used for the manufacture of curable mixtures described in the examples which follow:

MANUFACTURE OF THE DIESTER-DICARBOXYLIC ACIDS

Diester-dicarboxylic Acid A 2,128 g (14.0 mols) of tetrahydrophthalic anhydride are mixed with 728 g (7.0 mols) of neopentyl glycol and 1.0 ml of benzyldimethylamine. This reaction mixture is warmed under nitrogen and mixed, as soon as possible, by good stirring. When the temperature in the mixture has reached 120°C, an exothermic reaction occurs which heats the reaction mixture to a temperature of 170°C. The exothermic reaction is allowed to subside; at the same time the temperature should not fall below 150°C. Calculated from the start of the temperature drop, the mixture is allowed to react for 1 more hour.

The product then has an acid equivalent weight of 202 (theory 203) and at room temperature is a light yellow, highly viscous, almost glassy mass.

Diester-dicarboxylic Acid B 118.0 g (1 mol) of hexane-1,6-diol are mixed with 304.0 g (2 mols) of tetrahydrophthalic anhydride and 0.3 ml of benzyldimethylamine as the catalyst and allowed to react analogously to the description given for the diester-dicarboxylic acid A. The product is a light yellow, highly viscous substance having an acid equivalent weight of 207 (theory 211).

Polyester-dicarboxylic Acid C (Comparison Compound)

208.0 g (2 mols) of neopentyl glycol and 456.0 g (3 mols) of tetrahydrophthalic anhydride, corresponding to a molar ratio of glycol to anhydride of 2 : 3, are mixed and allowed to react under nitrogen for 8 hours at 160°–170°C, whilst continuously distilling off the water formed. The product is a light yellow, glassy mass and has an acid equivalent weight of 320.5 (theory 319).

Polyester-dicarboxylic Acid D (Comparison Compound)

156.0 g (1.5 mols) of neopentyl glycol are mixed with 304 g (2 mols) of tetrahydrophthalic anhydride and allowed to react under nitrogen for 9 hours at 160°–170°C whilst continuously distilling off the water formed. The reaction product is a light yellow, glassy mass having an acid equivalent weight of 385 (theory 437).

Diester-dicarboxylic Acid E 62.0 g (1.0 mol) of ethylene glycol are mixed with 304.0 g (2.0 mols) of tetrahydrophthalic anhydride, 0.3 ml of N-benzyldimethylamide is added and the mixture is heated to 130°C.

On heating, an exothermic reaction ensued at 130°C, in the course of which the temperature in the reaction mixture rose to 183°C. The mixture was then kept at 170°–180°C until it was no longer possible to detect any further anhydride bands in an IR spectrum and the acid equivalent weight was in the proximity of the theoretical value (time required: about 40 minutes). The reaction product was a light yellow, glassy substance with an acid equivalent weight of 181 (theory 183).

Diester-dicarboxylic Acid G 62.0 g (1.0 mol) of ethylene glycol are mixed with 308.0 g (2.0 mols) of hexahydrophthalic anhydride, 0.2 ml of benzyldimethylamine is added and the mixture is heated to 160°–170°C. On heating, an exothermic reaction ensued at 150°C, in the course of which the temperature in the reaction mixture rose to 168°C. The mixture was then kept at 160°–170°C until it was no longer possible to detect any anhydride bands in an IR spectrum and the acid equivalent weight was in the proximity of the theoretical value (time required: 2½ hours). The reaction product was a light yellow substance of high viscosity with an acid equivalent weight of 184 (theory 185).

Diester-dicarboxylic Acid H 50.5 g (0.25 mols) of dodecane-1,12-diol are mixed with 77.0 g (0.50 mols) of hexahydrophthalic anhydride, the mixture is treated with 0.1 ml of benzyldimethylamine and heated to 160°–170°C. In an IR spectrum it was no longer possible to detect any anhydride in the reaction mixture after 1 hour and the acid equivalent weight was 245 (theory 255). The product was a pale yellow substance of high viscosity.

EXAMPLES

EXAMPLE 1

100 parts by weight of an epoxide resin manufactured from bisphenol A and epichlorohydrin, having an epoxide content of 5.2 equivalents per kg, are mixed with 30 parts by weight of diester-dicarboxylic acid A, 50 parts by weight of methyltetrahydrophthalic anhydride and 0.05 part by weight of tetramethylammonium chloride and the mixture is warmed to 120°C. After a short vacuum treatment to remove air bubbles, the mixture is poured into prewarmed aluminium moulds, plaques of 120×120×4 mm being manufactured for the determination of the flexural strength, deflection, impact strength and heat distortion points, the appropriate test specimens being machined from the plaques.

After curing for 16 hours at 130°C, the following properties are measured:

| | |
|---|---|
| Flexural strength according to VSM 77103 | 14 kp/mm² |
| Deflection according to VSM 77103 | 11 mm |
| Impact strength according to VSM 77105 | 45 cmkp/cm² |
| Heat distortion point according to DIN 53548 | 85°C |
| tg δ (50 Hz) at 20°C | 0.005 |
| 60°C | 0.005 |

COMPARISON EXPERIMENTS

Using the same resin as in Example 1, the mechanical properties of the following two mixtures are measured:

Mixture a. 100 parts by weight of resin, 42 parts by weight of polyester C, 53 parts by weight of methyltetrahydrophthalic anhydride and 0.05 parts by weight of tetramethylammonium chloride.

Mixture b. 100 parts by weight of resin, 46 parts by weight of polyester D, 54 parts by weight of methyltetrahydrophthalic anhydride and 0.05 parts by weight of tetramethylammonium chloride.

The plaques required for the manufacture of the test specimens are uniformly cured for 16 hours at 130°C. The following properties result:

| | Mixture a | Mixture b |
|---|---|---|
| Flexural strength according to VSM 77103, kp/mm² | 14.5 | 14 |
| Deflection according to VSM 77103, mm | 9 | 7.5 |
| Impact strength according to VSM 77105, cmkp/cm² | 27 | 22 |
| Heat distortion point according to DIN 53458, °C | 80 | 75 |

EXAMPLE 2

100 parts by weight of the same epoxide resin as in Example 1 are mixed with 32 parts by weight of the diester-dicarboxylic acid B, 53 parts by weight of methyltetrahydrophthalic anhydride and 0.05 part by weight of tetramethylammonium chloride and the mixture is warmed to 120°C. The procedure of Example 1 is followed for determining the mechanical properties. The following properties are obtained:

| | |
|---|---|
| Flexural strength according to VSM 77103 | 13.5 kp/mm² |
| Deflection according to VSM 77103 | 13 mm |
| Impact strength according to VSM 77105 | 63 cmkp/cm² |
| Heat distortion point according to DIN 53458 | 80°C |
| tg δ (50 Hz) at 20°C | 0.005 |
| 60°C | 0.007 |

EXAMPLE 3

30 parts by weight of the diester-dicarboxylic acid A, 60 parts by weight of methylnadic anhydride and 0.1 part by weight of 2,4-methylethyl-imidazole are added to 100 parts by weight of the same resin as in Example 1. The test specimens required for determination of the mechanical properties are cured for 16 hours at 130°C. The measurement gives the following values:

| | |
|---|---|
| Flexural strength according to VSM 77103 | 14 kp/mm² |
| Deflection according to VSM 77103 | 9 mm |
| Impact strength according to VSM 77105 | 55 cmkp/cm² |
| Heat distortion point according to DIN 53458 | 97°C |

EXAMPLE 4

100 parts by weight of an epoxide resin novolac having an epoxide content of 5.6 equivalents per kg are mixed with 36 parts by weight of the diester-dicarboxylic acid A, 53 parts by weight of methyltetrahydrophthalic anhydride and 0.05 part by weight of tetramethylammonium chloride. The mixture is warmed to 120°C and after the vacuum treatment to remove the air the mixture is poured into the prewarmed aluminium moulds. The test specimens for the determination of the mechanical properties are cut therefrom after curing for 16 hours at 130°C. The following values are measured:

| | |
|---|---|
| Flexural strength according to VSM 77103 | 15 kg/mm² |
| Deflection according to VSM 77103 | 11 mm |
| Impact strength according to VSM 77105 | 45 cmkp/cm² |
| Heat distortion point according to DIN 53458 | 98°C |

EXAMPLE 5

100 parts by weight of epoxide resin novolac with an epoxide content of 5.6 epoxide equivalents/kg are treated with 37 parts by weight of diester-dicarboxylic acid B, 55 parts by weight of methyltetrahydrophthalic anhydride and 0.16 parts by weight of a 30% solution of tetramethylammonium in acetic acid. The mixture is subjected to a brief vacuum treatment to remove the air bubbles and then poured into preheated aluminium moulds. In order to test the flexural strength, deflection, impact strength and dimensional stability under heat, sheets measuring 120×120×4 mm are manufactured from which the corresponding test articles are processed. After a curing for 16 hours at 130°C the following properties are measured:

| | |
|---|---|
| Transition temperature (measured in a differential scanning calorimeter, Perkin-Elmer, DSC-1) | 120°C |
| Flexural strength (acc. VSM 77103) | 15 kp/mm² |
| Impact strength (acc. VSM 77105) | 35–40 cmkp/cm² |
| Deflection (acc. VSM 77103) | 10.5 mm |

EXAMPLE 6

100 parts by weight of an epoxide resin, manufactured by a known process from hydrogenated bisphenol A and epichlorohydrin, with a content of 4.55 epoxide equivalents/kg, are treated with 25 parts by weight of diester-dicarboxylic acid A, 45 parts by weight of methyltetrahydrophthalic anhydride and 0.16 parts by weight of a 30 % solution of tetramethylammonium chloride in acetic acid. This mixture is heated to 130°C. The mechanical properties are determined by proceeding as in Example 1. After a curing of 16 hours at 130°C the resulting test articles display the following results:

| | |
|---|---|
| Transition temperature measured in a differential scanning calorimeter, Perkin-Elmer, DSC-1) | 76°C |
| Flexural strength (acc. VSM 77103) | 11.6 kp/mm² |
| Impact strength (acc. VSM 77105) | 20–25 cmkp/cm² |
| Deflection (acc. VSM 77103) | 9.2 mm |

EXAMPLE 7

100 parts by weight of tetrahydrophthalic diglycidyl ester with a content of 6.4 epoxide equivalents per kg are treated with 48 parts by weight of diester-dicarboxylic acid A, 55 parts by weight of methyltetrahydrophthalic anhydride and 0.16 parts by weight of a 30% solution of tetramethylammonium chloride in acetic acid. The mechanical properties are determined by proceeding as in Example 1. After a curing of 5 hours at 110°C and 10 hours at 150°C the following properties are measured:

| | |
|---|---|
| Transition temperature (measured in a differential scanning calorimeter, Perkin-Elmer, DSC-1) | 87°C |
| Flexural strength (acc. VSM 77103) | 15.7 kp/mm² |
| Impact strength (acc. VSM 77105) | 22.5 cmkp/cm² |
| Deflection (acc. VSM 77103) | 7.0 mm |

EXAMPLE 8

100 parts of a hexahydrophthalic diglycidyl ester with a content of 6.4 epoxide equivalents per kg are treated with 48 parts by weight of diester-dicarboxylic acid A, 55 parts by weight of methyltetrahydrophthalic anhydride and 0.16 parts by weight of a 30 % solution of tetramethylammonium chloride in acetic acid. The mechanical properties are determined by proceeding as in Example 1. After a curing of 5 hours at 110°C and 10 hours at 150°C the following properties are measured:

| | |
|---|---|
| Transition temperature (measured in a differential scanning calorimeter, Perkin-Elmer, DSC-1) | 86°C |
| Flexural strength (acc. VSM 77103) | 14.5 kp/mm² |
| Impact strength (acc. VSM 77105) | 24.5 cmkp/cm² |
| Deflection (acc. VSM 77103) | 7.8 mm |

EXAMPLE 9

100 parts by weight of an epoxide resin manufactured from bisphenol A and epichlorohydrin with an epoxide content of 5.2 equivalents/kg are mixed with 35 parts by weight of diester-dicarboxylic acid H, 53 parts by weight of methyltetrahydrophthalic anhydride and 0.05 parts by weight of tetramethylammonium chloride and the mixture is heated to 120°C. The mechanical properties are determined by proceeding as in Example 1. After a curing of 16 hours at 130°C the following properties are measured:

| | |
|---|---|
| Transition temperature (measured in a differential scanning calorimeter, Perkin-Elmer, DSC-1) | 90°C |
| Flexural strength (acc. VSM 77103) | 13 kp/mm² |
| Impact strength (acc. VSM 77105) | 44 cmkp/cm² |
| Deflection (acc. VSM 77103) | 13 mm. |

EXAMPLE 10

100 parts by weight of an epoxide resin manufactured from bisphenol A and epichlorohydrin with an epoxide content of 5.2 equivalents/kg are mixed with 30 parts by weight of diester-dicarboxylic acid G, 50 parts by weight of methyltetrahydrophthalic anhydride and the mixture is heated to 120°C. The mechanical properties are determined by proceeding as in Example 1. After a curing of 16 hours at 130°C the following properties are measured:

| | |
|---|---|
| Transition temperature (measured in a differential scanning calorimeter, Perkin-Elmer, DSC-1) | 101.5°C |
| Flexural strength (acc. VSM 77103) | 15 kp/mm² |
| Impact strength (acc. VSM 77105) | 33 cmkp/cm² |
| Deflection (acc. VSM 77103) | 11 mm. |

What we claim is:

1. A hot-curable resin mixture, consisting essentially of
    a. a 1,2-polyepoxide;
    b. a dicarboxylic acid of the formula I

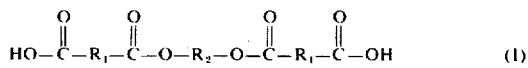

in which R₁ has the formula

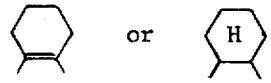

and R₂ is alkylene of the formula $-(CH_2)\overline{_{2\,to\,12}}$ or

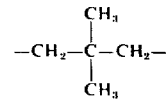

c. a polycarboxylic acid anhydride selected from the group consisting of methyltetrahydrophthalic anhydride and methylnadic anhydride; and
    d. a quaternary ammonium compound or an imidazole catalyst,
and that 0.05 to 0.8 equivalent of said dicarboxylic acid and 0.20 to 0.95 mol of said polycarboxylic acid anhydride are present per 1 equivalent of said polyepoxide.

2. The resin mixture according to claim 1 wherein said catalyst is a quaternary ammonium compound.

3. The resin mixture according to claim 2 wherein said catalyst is tetramethylammonium chloride.

4. The resin mixture according to claim 1 wherein said catalyst is 2,4-methylethylimidazole.

5. The resin mixture according to claim 1 characterized in that it contains 0.15 to 0.5 equivalent of said dicarboxylic acid and 0.5 to 0.85 mol of said polycarboxylic acid anhydride per 1 equivalent of polyepoxide compound.

6. The resin mixture according to claim 1 wherein said dicarboxylic acid is the reaction product of two mols of tetrahydrophthalic anhydride or hexahydrophthalic anhydride and 1 mol of a glycol selected from the group consisting of ethylene glycol, hexane-1,6-diol, dodecan-1,12-diol and neopentyl glycol.

* * * * *